Feb. 28, 1956   E. G. HUNSICKER   2,736,887
AIR RAID WARNING DEVICE
Filed June 10, 1952   2 Sheets-Sheet 1

INVENTOR.
ERNEST G. HUNSICKER
BY
William Cleland
ATTORNEY

Feb. 28, 1956  E. G. HUNSICKER  2,736,887
AIR RAID WARNING DEVICE
Filed June 10, 1952  2 Sheets-Sheet 2
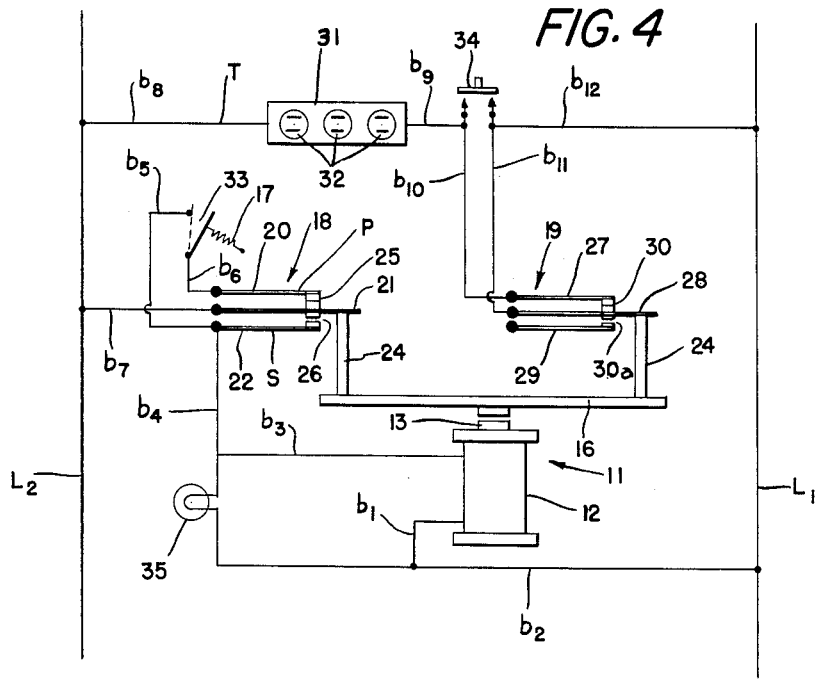
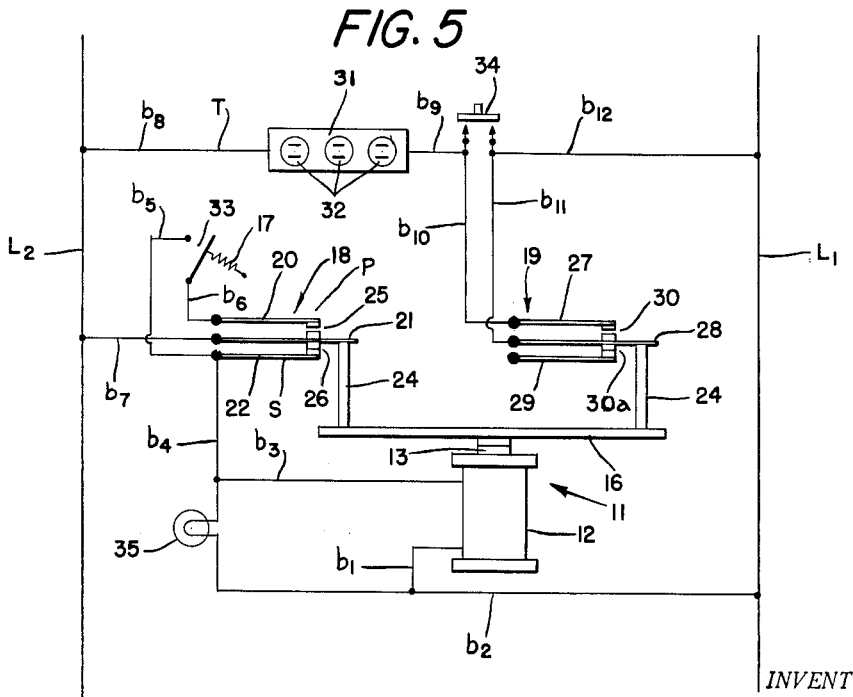
INVENTOR.
ERNEST G. HUNSICKER
BY
William Cleland
ATTORNEY

United States Patent Office 2,736,887
Patented Feb. 28, 1956

2,736,887
AIR RAID WARNING DEVICE

Ernest G. Hunsicker, Akron, Ohio

Application June 10, 1952, Serial No. 292,644

11 Claims. (Cl. 340—310)

This invention relates to a warning device for electrically operated signals, and in particular for use during air raids.

In the past, there have been provided various air raid warning devices of a type adapted to operate a signal of some form in homes and places of business, for example, as controlled from a central control station at a remote location. These, however, have been withheld from actual use, ostensibly because the equipment necessary both at the sending and receiving ends was complicated and expensive.

One object of the present invention is to provide a small, compact, and relatively inexpensive warning device adapted to have readily connected thereto various signal means, such as radio or television sets or electric lamps readily available in homes and places of business, the same being adapted to be operated simultaneously with any number of similar warning devices over a relatively large area in a community as by a person located at a remote central control point, and such control being accomplished without use of other than available equipment at said control point.

Another object of the invention is to provide a warning device of the character described in the preceding object, which is operable simultaneously with any number of similar devices to produce visible or audible warning signals upon momentary interruption of electrical current supply to the devices, as controlled at a main power plant or a power plant sub-station.

Other objects of the invention will be manifest from the following brief description and the accompanying drawings.

Of the accompanying drawings:

Figure 4 is a schematic wiring diagram of the warning device of Figure 1, the same being shown in an initial or unset condition thereof.

Figure 5 is a schematic wiring diagram the same as Figure 4, except that it is shown set or energized in condition for subsequent automatic operation for warning purposes.

Figure 1:
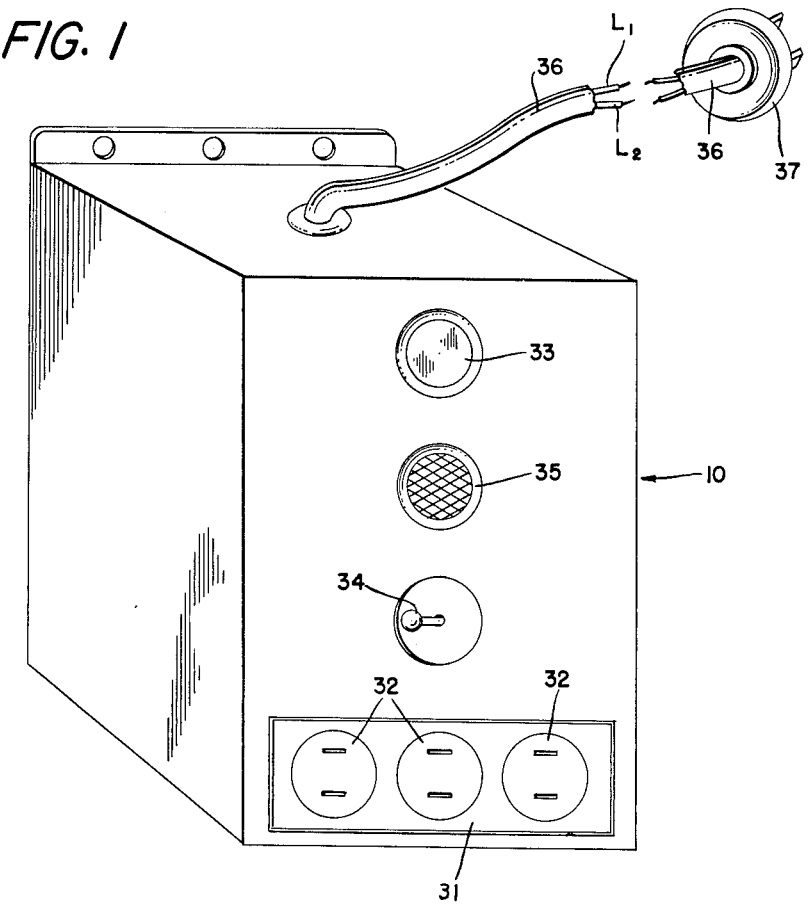
Figure 1 is a perspective view of an air raid warning device embodying the feature of the invention.

In Figure 1 there is shown one embodiment of the improved warning device, including a hollow casing 10 which houses the working mechanism and wiring which is shown schematically in Figures 2 to 5. The simplicity of the device is evident by the fact that the completely operable unit is of such small, compact size that it could be held in the palm of the hand.

Figure 3:
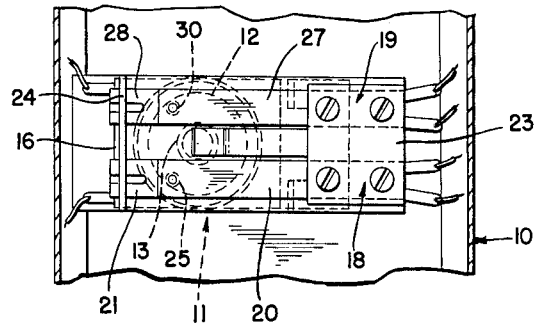
Figure 3 is a top plan view of the operating mechanism shown in Figure 2.
Figure 2:
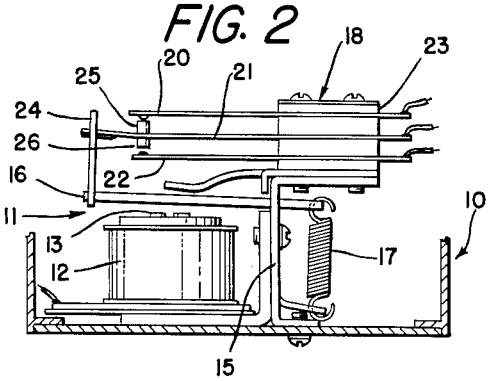
Figure 2 is a side elevation of an electromagnet and relay switch means operable therein, the same being part of the operating mechanism contained in the warning device.

As best shown in Figures 2 and 3, mounted within casing 10 may be an electromagnet 11, including a coil 12, within which is a central core 13 of soft iron, a portion of which protrudes above the top of the coil, and a suitable bracket 15 thereof pivotally supports a metal armature 16 to extend over said core projection, spring means 17 normally urging the armature away from said core. Mounted on top of bracket 15 may be a pair of relay switches 18 and 19.

A first switch 18 includes three spring contact elements 20, 21 and 22 mounted on an insulating block 23 to extend substantially in parallelism over the armature 16, the central element 21 being vertically movable with the armature 16, upon operation of the coil 12, through a vertical connecting link 24. Between the top and intermediate contact elements 20 and 21 are normally closed contact points 25, and between the intermediate and bottom contact elements 21 and 22 are normally open contacts 26 (see Figures 2, 4 and 5), these normally closed and open contacts being opened and closed, respectively, by energization of coil 12 to draw the armature 16 toward core 13 against the action of spring 17. Conversely, upon deenergization of the coil the spring urges the armature upwardly to set the contacts 25 and 26 in the original closed and open positions thereof.

The second relay switch 19 includes spring contact elements 27, 28 and 29 corresponding to elements 20, 21 and 22 of switch 18 (see Figures 3, 4 and 5). As before, upon energization of coil 12 armature 16 through link 24 moves intermediate contact element 28 to open normally closed contact points 30 between the elements 27 and 28. Contact points 30a between elements 28 and 29 are not used in the present system except as auxiliary or balancing spring means for switch 19.

Mounted within the casing 10 may be an outlet connector 31 having one or more sockets 32, 32 for plugging in one or more commonly available warning devices, such as a radio or television set, an electric bell or buzzer, or an electric lamp. Also mounted in the casing 10 may be a momentary or spring-pressed switch 33, for setting the device in a manner to be described, a normally open holding switch 34 for supplying current to the connector independently of operation of the device for warning purposes, as for operating a radio set, television set, or a lamp, before setting the device for said warning purposes, and a pilot light 35 (probably red or covered with red glass) which will be lighted when the device is so set for warning purposes. A double wire lead-in cable 36 extending from the interior of the casing has a pronged plug 37 of the usual type for plugging the same into the usual wall outlet socket to a 110 v. source of electrical current from a power plant or power sub-station.

The electrical interconnection of the parts or mechanisms enumerated above will be best understood in connection with a description of the wiring diagrams in Figures 4 and 5, which, as previously stated, illustrate schematically all of the elements compactly contained within casing 10.

Referring first to Figure 4, showing the device in normal inoperative condition, the electromagnet coil 12 is connected in a normally open primary circuit P, which includes at one side thereof lines $b_1$ and $b_2$ to a line $L_1$ of a source of 110 v. electrical current from a central power plant (not shown), and includes at the other side thereof, lines $b_3$ and $b_4$ to contact element 22, line $b_5$, through normally open momentary switch 33, line $b_6$, contact element 20, normally closed contacts 25, contact element 21, and line $b_7$ to line $L_2$ of said power source. Thus, because switch 33 is open in primary circuit P, no current flows to the electromagnet 11.

A normally open secondary circuit S containing the coil 12 includes on one side thereof said lines $b_1$ and $b_2$ to main line $L_1$, and on the other side lines $b_3$ and $b_4$ to contact element 22, normally open contacts 26, contact element 21, and line $b_7$ to main line $L_2$. Here again the electromagnet is inoperative because contacts 26 of switch 18 are normally open. The pilot light 35 is connected between lines $b_4$ and $b_2$ parallel to coil 12, and hence is normally extinguished.

The connector or outlet box 31 is connected in a normally closed third circuit T, at one side thereof to main line $L_2$, through line $b_8$, and at the other side to line $L_1$, through lines $b_9$ and $b_{10}$ to contact element 27 of switch 19, closed contacts 30 and contact element 28 thereof, and lines $b_{11}$ and $b_{12}$. Circuit T is normally closed, as stated, in the sense that a radio set, television set, floor or table lamp or like appliance may be energized for normal use upon plugging the same into connector 31. The holding switch 34 is connected between lines $b_9$ and $b_{12}$ in parallel to lines $b_{10}$ and $b_{11}$, and is normally open, as shown, for reasons to be described.

In order to set the warning device 10 for an automatic operation, as for example to warn occupants of a residence of a subsequent air raid, a radio set (not shown) is plugged into one of the sockets 32 of connector 31 and tuned loudly to a previously designated radio station which continuously broadcasts audible signals including regular and special programs and/or announcements. After turning on said radio the switch 33 is momentarily depressed, thereby momentarily closing the aforesaid primary circuit P to the coil 12 and energizing the same. Energizing coil 12 magnetically attracts armature 16, and thereby closes contacts 26 of switch 18 and opens contacts 25 and 30 of switches 18 and 19, respectively.

Although energization of coil 12 through primary circuit P was only momentary, as described, the immediate effect of closing the secondary circuit through the closed contacts 26 is to maintain the coil energized as long as their is no interruption in the flow of current to the secondary circuit, as indicated by the pilot light 35 remaining on. This preset "alert" condition of the system is shown in Figure 5, and remains in such condition as long as current flows in the lines $L_1$ and $L_2$ to keep the electromagnet energized through the secondary circuit. In the meantime, if so desired, the radio or other signalling device will be shut off because the contacts 30 are open, but may be operated at will by closing the holding switch 34. To be effective as a warning, however, the radio must be shut off only by opening switch 34.

Now, supposing an air raid is immediately impending and assuming that various units 10 throughout a community have been preset as shown in Figure 5, with radios or other signalling means plugged to connectors 31, and that a designated attendant at the central power plant of said community has been instructed by the area civil defense authority to give warning, said attendant merely pulls a main switch at the power plant for a very brief moment, thereby momentarily to interrupt the flow of current all over the community serviced by the power plant. This momentary interruption of current in each instance, is effective in each unit 10 to deenergize the electromagnet 11, and thereby allow the spring 17 thereof to move the armature 16 upwardly of coil 12. This closes contacts 25 and 30 of switches 18 and 19, respectively, and opens contacts 26 of said switch 18. In other words, the immediate effect is to return the electrical system to the condition thereof shown in Figure 4, in which the primary and secondary circuits P and S are open and, therefore, ineffective to operate the electromagnet, and the third circuit T is closed to the lines $L_1$ and $L_2$, and the radio set, for example, connected to connector 31 is turned on full blast to arouse a person or persons nearby. At the same time the pilot lamp 35 on the casing 10 will go out, the same being in parallel with the electromagnet 11. A bright lamp may be connected to connector 31 to serve as a warning to deaf mutes, or the same may be so connected as a supplement or a substitute for radio or other sound-making devices.

Thus, has been provided a very simple and relatively inexpensive device for warning of impending danger. In the case of air raids the devices may be furnished to or acquired by all affected citizens serviced by a particular power plant, or furnished to designated air raid wardens who upon receiving a warning through the device as described, relay the same by suitable methods to others under their jurisdiction. Manifestly, a siren or other air raid alarm device may be connected to the connector 31, or used in place thereof, as a part of the unit 10 (Figure 1). When radio or television is the medium of sounding the alarm the same may be utilized to broadcast instructions pursuant to the initial warning sounded through the device 10.

Modifications of the invention may be resorted to without departing from the spirit thereof or the scope of the appended claims.

What is claimed is:

1. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electrical connector circuit having connected therein said connector, a normally closed connector switch, and means including an electrical extension cord from said housing for connecting the circuit to a said system wiring; electrically energizable control means in a separate circuit to said means for connecting for holding said switch open when energized; means operable to maintain said control means energized as long as the current thereto from said system wiring is uninterrupted; whereby momentary interruption of said electrical potential is effective to deenergize said control means to close said connector switch and thereby close said connector circuit for operating a said signal means attached to said connector.

2. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electrical connector circuit having connected therein said connector, a normally closed connector switch, and means including an electrical extension cord from said housing for connecting the circuit to a said system wiring; electrically energizable control means in a separate circuit to said means for connecting for holding said switch open when energized; means operable to maintain said control means energized as long as the current thereto from said system wiring is uninterrupted; whereby momentary interruption of said electrical potential is effective to deenergize said control means to close said connector switch and thereby close said connector circuit for operating a said signal means; a holding switch being provided in said connector circuit connected in parallel to said connector switch for operating a said signal independently of said control means.

3. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electrical connector circuit having connected therein said connector, a normally closed connector switch, and means including an electrical extension cord from said housing for connecting the circuit to a said system wiring; electrically energizable control means in a separate circuit to said means for connecting for holding said switch open when energized; means operable to maintain said control means energized as long as the current thereto from said system wiring is uninterrupted; whereby momentary interruption of said electrical potential is effective to deenergize said control means to close said connector switch and thereby close said connector circuit for operating a said signal means; a lamp means mounted on said housing and electrically connected to said separate circuit in parallel to said control means to indicate on and off conditions of the same.

4. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electrical connector circuit having connected therein said connector, a normally closed connector switch, and means including an electrical extension cord from said housing for connecting the circuit to a said system wiring; electrically energizable control means in a separate circuit to said means for connecting for holding said switch open when energized; means operable to maintain said control means energized as long as the current thereto from said system wiring is uninterrupted; whereby momentary interruption of said electrical potential is effective to deenergize said control means to close said connector switch and thereby close said connector circuit for operating a said signal means; a holding switch being provided in said connector circuit connected in parallel to said connector switch for operating a said signal means independently of said control means; a lamp means being electrically connected to said separate circuit in parallel to said control means to indicate on and off conditions of the same.

5. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; inlet wiring for connecting said connector to said system wiring; normally closed contacts in a primary circuit connected to said system wiring through a normally open manually operable switch, normally open contacts in a secondary circuit, and said inlet wiring; normally closed contacts in a third electrical circuit connected to said connector; electrically energized control means in said primary and secondary circuits for opening said contacts of the primary and third circuits and closing said contacts of the secondary circuit; momentary closing of said manually operable switch thereby closing said primary circuit to energize said control means and thereby open said normally closed contacts of the primary and third circuits and close the normally open contacts of said secondary circuit; whereby the control means is energized through said secondary circuit as long as current from said source is uninterrupted; momentary interruption of current from said system wiring thereby being effective to deenergize said control means to return said circuits to normal condition in which said third circuit is connected through said connector for operating a signal.

6. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; inlet wiring for connecting said connector to said system wiring; normally closed contacts in a primary circuit connected to said system wiring through a normally open manually operable switch, normally open contacts in a secondary circuit connected to said inlet wiring independently of said manually operable switch; normally closed contacts in a third circuit connected to said inlet wiring; electrically energized control means in said primary and secondary circuits for opening said contacts of the primary and third circuits and closing said contacts of the secondary circuit; momentary closing of said manually operable switch thereby momentarily closing said primary circuit to energize said control means and thereby open said normally closed contacts of the primary and third circuits and close the normally open contacts of said secondary circuit; whereby the control means is energized through said secondary circuit as long as current from said system wiring is uninterrupted; momentary interruption of current in said system wiring thereby being effective to deenergize said control means to return said circuits to normal condition in which said third circuit is connected through said connector for operating a said signal means.

7. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electromagnet and an armature movable thereby; and first and second relay switches operable by magnetic attraction of said armature; said first relay switch including normally closed contacts in a primary circuit; means including an electrical extension cord from said housing for connecting said normally closed contacts to said system wiring through said electromagnet and having therein a normally open manually operable switch, said first relay also including normally open contacts in a secondary circuit connected to said electromagnet; said second relay switch including normally closed contacts in a third circuit operatively connected to said system wiring through said connector; momentary closing of said manually operable switch thereby closing said primary circuit to energize said electromagnet and through magnetic attraction of the armature operating said relay switches to open said normally closed contacts thereof and also to close the normally open contacts of the first relay switch; closing of the normally open contacts of the first relay switch thereby holding the electromagnet energized through said secondary circuit as long as current from said source is uninterrupted; momentary interruption of electrical potential as at said central power plant thereby being effective to deenergize said electromagnet to return said first and second relay switches to normal condition in which said third circuit is connected through said connector for operating a said signal means connected therein.

8. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electromagnet and an armature movable thereby; and first and second relay switches operable by magnetic attraction of said armature; said first relay switch including normally closed contacts in a primary circuit; means including an electrical extension cord from said housing for connecting said normally closed contacts to said system wiring through said electromagnet and through a normally open manually operable switch; said first relay switch also including normally open contacts in a secondary circuit connected to said system wiring and said electromagnet independently of said manually operable switch; said second relay switch including normally closed contacts in a third electrical circuit connected through said connector; momentary closing of said manually operable switch thereby closing said primary circuit to energize said electromagnet and through magnetic attraction of the armature operating said relay switches to open said normally closed contacts thereof and also to close the normally open contacts of the first relay switch; closing of the normally open contacts of the first relay switch thereby holding the electromagnet energized through said secondary circuit as long as current from said source is uninterrupted; momentary interruption of said electrical potential in said wiring system thereby being effective to deenergize said electromagnet to return said first and second relay switches to normal condition in which said third circuit is connected through said connector for operating a said signal means connected therein.

9. An automatic warning device for use with an existing centrally controlled electrical wiring system of the type maintaining a source of electrical potential and normally utilized to operate various electrical appliances, including those of the class serviceable as a visible warning signal means, said device comprising as a self-contained unit within a compact housing: an electrical connector having a portion presented outwardly of the housing for attachment of a said signal means; an electromagnet and an armature movable thereby; and first and second relay switches operable by magnetic attraction of said armature; said first relay switch including normally closed contacts in a primary circuit; means including an electrical extension cord from said housing for connecting said normally closed contacts to said system wiring through said electromagnet and through a normally open manually operable switch; said first relay switch also including normally open contacts in a secondary circuit connected to said system wiring and said electromagnet independently of said manually operable switch; said second relay switch including normally closed contacts in a third electrical circuit connected through said connector; momentary closing of said manually operable switch thereby closing said primary circuit to energize said electromagnet and through magnetic attraction of the armature operating said relay switches to open said normally closed contacts thereof and also to close the normally open contacts of the first relay switch; closing of the normally open contacts of the first relay switch thereby holding the electromagnet energized through said secondary circuit as long as current from said source is uninterrupted; momentary interruption of said electrical potential in said wiring system thereby being effective to deenergize said electromagnet to return said first and second relay switches to normal condition in which said third circuit is connected through said connector for operating a said signal means connected therein; a holding switch being provided in said third circuit in parallel to said connector switch for operating a said signal independently of said electromagnet.

10. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electromagnet and an armature movable thereby; and first and second relay switches operable by magnetic attraction of said armature; said first relay switch including normally closed contacts in a primary circuit; means including an electrical extension cord from said housing for connecting said normally closed contacts to said system wiring through said electromagnet and through a normally open manually operable switch; said first relay switch also including normally open contacts in a secondary circuit connected to said system wiring and said electromagnet independently of said manually operable switch; said second relay switch including normally closed contacts in a third electrical circuit connected through said connector; momentary closing of said manually operable switch thereby closing said primary circuit to energize said electromagnet and through magnetic attraction of the armature operating said relay switches to open said normally closed contacts thereof and also to close the normally open contacts of the first relay switch; closing of the normally open contacts of the first relay switch thereby holding the electromagnet energized through said secondary circuit as long as current from said source is uninterrupted; momentary interruption of said electrical potential in said wiring system thereby being effective to deenergize said electromagnet to return said first and second relay switches to normal condition in which said third circuit is connected through said connector for operating a said signal means connected therein; a lamp means being electrically connected to said secondary circuit independently of said primary circuit and in parallel to said electromagnet to indicate on and off conditions of the electromagnet.

11. An automatic warning device for use with an existing centrally controlled electrical wiring system of the type maintaining a source of electrical potential and normally utilized to operate various electrical appliances, including those of the class serviceable as a visible or audible warning signal means, said device comprising as a self-contained unit within a compact housing: an electrical connector having a portion presented outwardly of the housing for attachment of a said signal means; an electromagnet and an armature movable thereby; and first and second relay switches operable by magnetic attraction of said armature; said first relay switch including normally closed contacts in a primary circuit; means including an electrical extension cord from said housing for connecting said normally closed contacts to said system wiring through said electromagnet and through a normally open manually operable switch; said first relay switch also including normally open contacts in a secondary circuit connected to said system wiring and said electromagnet independently of said manually operable switch; said second relay switch including normally closed contacts in a third electrical circuit connected through said connector; momentary closing of said manually operable switch thereby closing said primary circuit to energize said electromagnet and through magnetic attraction of the armature operating said relay switches to open said normally closed contacts thereof and also to close the normally open contacts of the first relay switch; closing of the normally open contacts of the first relay switch thereby holding the electromagnet energized through said secondary circuit as long as current from said source is uninterrupted; momentary interruption of said electrical potential in said wiring system thereby being effective to deenergize said electromagnet to return said first and second relay switches to normal condition in which said third circuit is connected through said connector for operating a said signal means connected therein; a holding switch being provided in said third circuit in parallel to said connector switch for operating a said signal means independently of said electromagnet; and lamp means electrically connected to said secondary circuit independently of said primary circuit and in parallel to said electromagnet to indicate on and off conditions of the electromagnet.

References Cited in the file of this patent

UNITED STATES PATENTS

| | | |
|---|---|---|
| 1,091,038 | Chase | Mar. 24, 1914 |
| 1,158,146 | Olney | Oct. 26, 1915 |
| 2,029,402 | Alexander | Feb. 4, 1936 |
| 2,335,382 | Bonanno | Nov. 30, 1943 |
| 2,458,583 | Frank | Jan. 11, 1949 |
| 2,566,121 | Decker | Aug. 28, 1951 |
| 2,566,597 | Cass | Sept. 4, 1951 |
| 2,582,790 | Newell | Jan. 15, 1952 |
| 2,658,192 | Spoon et al. | Nov. 3, 1953 |
| 2,670,466 | Harper | Feb. 23, 1954 |